United States Patent
Cho et al.

(10) Patent No.: US 8,942,744 B2
(45) Date of Patent: Jan. 27, 2015

(54) WHITE SPACE USE SYSTEM WITH CONNECTING COGNITIVE SIGNAL

(71) Applicant: Electronics and Telecommunications Research Institute, Daejeon (KR)

(72) Inventors: Sang In Cho, Daejeon (KR); Kyu Min Kang, Daejeon (KR); Byung Jang Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 224 days.

(21) Appl. No.: 13/717,685

(22) Filed: Dec. 17, 2012

(65) Prior Publication Data

US 2013/0184025 A1 Jul. 18, 2013

(30) Foreign Application Priority Data

Dec. 15, 2011 (KR) ........................ 10-2011-0135196

(51) Int. Cl.
| | |
|---|---|
| H04B 7/00 | (2006.01) |
| H04W 72/04 | (2009.01) |
| H04L 27/00 | (2006.01) |
| H04W 52/24 | (2009.01) |
| H04W 16/14 | (2009.01) |
| H04W 72/00 | (2009.01) |
| H04W 52/28 | (2009.01) |

(52) U.S. Cl.
CPC ....... *H04W 72/0453* (2013.01); *H04L 27/0006* (2013.01); *H04W 52/244* (2013.01); *H04W 16/14* (2013.01); *H04W 72/00* (2013.01); *H04W 52/283* (2013.01)
USPC ........................... 455/500; 455/450; 455/509

(58) Field of Classification Search
CPC .......... H04W 72/0453; H04W 52/244; H04W 16/14; H04W 72/00; H04W 52/283; H04L 27/0006
USPC .............. 455/500, 464, 179.1, 509, 450–454, 455/456.2, 510; 370/329, 332, 395.41; 375/E7.141
See application file for complete search history.

(56) References Cited

U.S. PATENT DOCUMENTS

| | | | |
|---|---|---|---|
| 6,914,876 B2 | 7/2005 | Rotstein et al. | |
| 8,437,790 B1* | 5/2013 | Hassan et al. ................. | 455/509 |
| 8,749,714 B2* | 6/2014 | Sadek et al. .................. | 348/723 |
| 8,824,382 B2* | 9/2014 | Shu et al. ....................... | 370/329 |
| 2009/0016293 A1 | 1/2009 | Kang et al. | |
| 2010/0195590 A1* | 8/2010 | Park .............................. | 370/329 |
| 2010/0216480 A1 | 8/2010 | Park et al. | |
| 2011/0043710 A1* | 2/2011 | Samarasooriya et al. .... | 348/735 |
| 2011/0116484 A1* | 5/2011 | Henry ........................... | 370/338 |
| 2011/0182257 A1* | 7/2011 | Raveendran et al. ......... | 370/329 |
| 2011/0287802 A1* | 11/2011 | Ma et al. ........................ | 455/517 |
| 2011/0306375 A1* | 12/2011 | Chandra et al. ............... | 455/509 |
| 2012/0093092 A1* | 4/2012 | Kasslin et al. ................. | 370/329 |
| 2012/0315855 A1* | 12/2012 | Li et al. ......................... | 455/67.7 |
| 2013/0059614 A1* | 3/2013 | Kannan et al. ................ | 455/500 |

FOREIGN PATENT DOCUMENTS

KR  2012-0118454 A  10/2012

* cited by examiner

*Primary Examiner* — Dominic E Rego
(74) *Attorney, Agent, or Firm* — Rabin & Berdo, P.C.

(57) ABSTRACT

Provided is a white space use system using a connection recognition signal, which is associated with technology that enables white space devices to search for and to use an available frequency band in a digital broadcasting system. In particular, provided is a white space use system using a connection recognition signal that enables even devices incapable of autonomously searching for an available channel to safely use a white space in interaction with white space devices.

1 Claim, 3 Drawing Sheets

WHITE SPACE USE SYSTEM WITH CONNECTING COGNITIVE SIGNAL

TECHNICAL FIELD

The present invention relates to a white space use system using a connection recognition signal, and is associated with technology that enables white space devices to search for and to use an available frequency band in a digital broadcasting system.

RELATED ART

In a digital broadcasting system, a white space device may search for and use an available channel. Here, a method used when the white space device searches for the to available channel may include a beacon using method, a spectrum sensing method, and a database using method.

In the beacon using method, all of the devices using the same frequency band may search for an available channel by transmitting a beacon. In the spectrum sensing method, the white space device may perform spectrum sensing in a desired area, and may directly search for the available channel based on the sensing result. In the database using method, devices using the same frequency band may be registered to a database, and the white space device may receive the available channel from the database based on a position of the white space device.

Meanwhile, a white space in a television (TV) broadcasting system refers to an empty band that is not regionally used in a TV broadcasting band. The white space generally has an excellent propagation characteristic and also has wide service coverage compared to a frequency of 1 GHz or more. Therefore, the white space may provide a variety of services, such as a service for providing public safety and regional information, a super wireless fidelity (Wi-Fi), and the like. Accordingly, there is a need for developing technology for using a TV white space in order to efficiently use insufficient frequency resources and to provide various high quality services.

DESCRIPTION OF THE INVENTION

Subject To Be Solved

An aspect of the present invention provides a white space use system using a connection recognition signal that enables even devices incapable of autonomously searching for an available channel to safely use a white space in interaction device with white space devices.

Another aspect of the present invention also provides a white space use system using a connection recognition signal that may adjust strength of a connection recognition signal transmitted from a white space device autonomously searching for and using an available to channel, based on a distance of arrival, and may transmit the strength adjusted connection recognition signal, thereby decreasing interference that may occur in another white space device using the connection recognition signal.

Solution

According to an aspect of the present invention, there is provided a white space use system, including: a first white space device to search for an available channel using at least one of a spectrum sensing, a database access function, and a beacon transmission and reception, and to use the retrieved available channel; and a second white space device that is not provided with a function of searching for the available channel using at least one of the spectrum sensing, the database access function, and the beacon transmission and reception. Through a cognitive radio communication scheme, the first white space device may transmit a connection recognition signal including information associated with the retrieved available channel, may adjust strength of the connection recognition signal based on a distance between a distance of arrival of a protection service and a current position of the first white space device, and may transmit the strength adjusted connection recognition signal. The second white space device may recognize the available channel used by the first white space device, based on the connection recognition signal transmitted from the first white space device.

DETAILED DESCRIPTION

Figure 1:
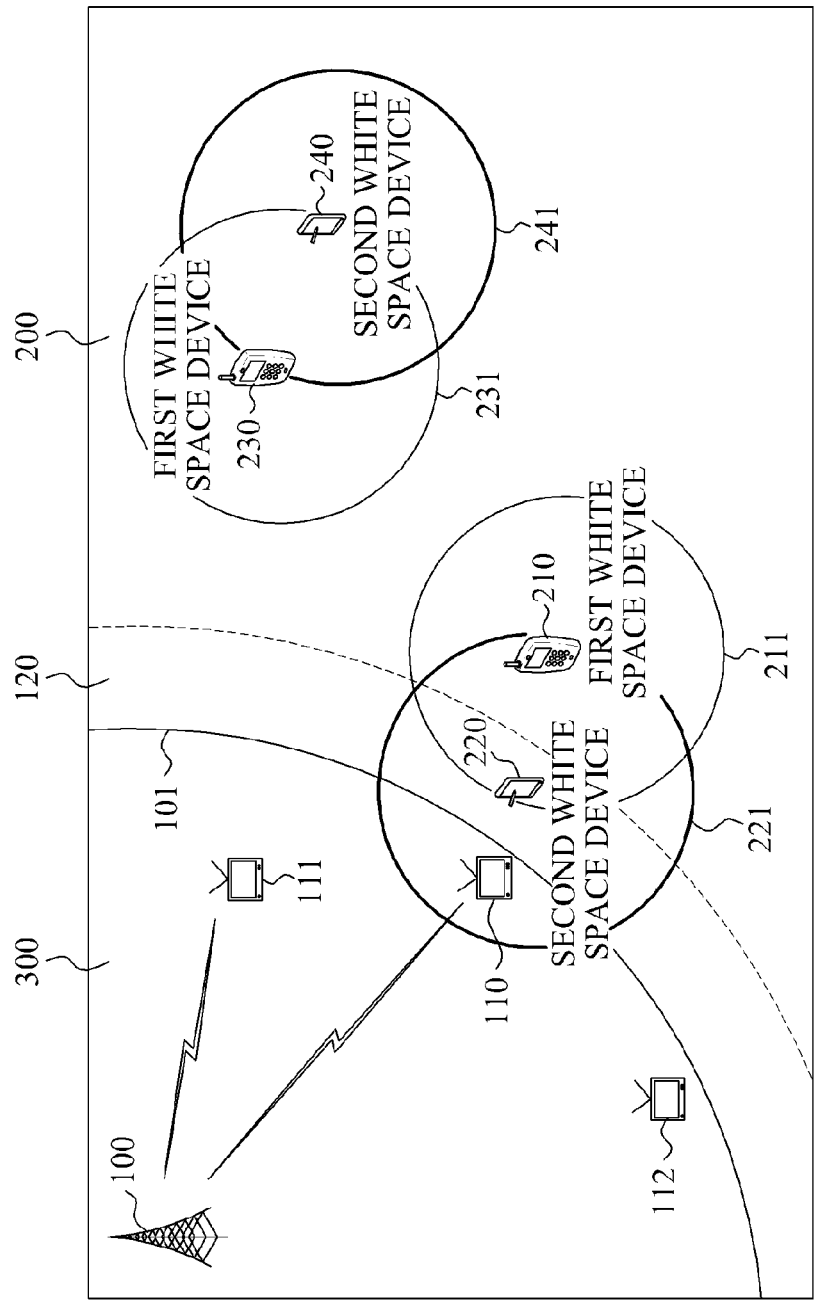
FIG. 1 is a diagram to describe interference that may occur due to a white space device in a digital broadcasting system.

Reference will now be made in detail to exemplary embodiments of the present invention, examples of which are illustrated in the accompanying drawings, wherein like reference numerals refer to the like elements throughout.

Hereinafter, embodiments of the present invention will be described by referring to the figures.

A white space device of the present invention may preferentially secure an existing service protection that is present within the same frequency band and thus, may need to search for an available channel of a white space prior to initiating communication. In particular, the present invention proposes a method that enables a device incapable of autonomously searching for the available channel to use the white space.

For example, the white space device may need to search for the available channel prior to initiating the communication. Similar to a related art, the white space device may perform a function of searching for the available channel by transmitting and receiving a beacon, by performing spectrum sensing, or by estimating a position and accessing a database. However, a predetermined white space device may not have the above function. Alternatively, such white space device may access another device that is in operation by obtaining the available channel. In this case, even though the white space device is accessible to the other device, the other device may not be positioned in the same place as a place where the white space device is positioned. Also, it may be difficult to guarantee that propagation transmitted from the other device is not out of coverage of the available channel. The present invention proposes a method that may prevent the propagation from being out of coverage of the available channel and thereby enables a device incapable of autonomously searching for an available channel to stably perform communication without causing interference in an existing service, even though the device incapable of autonomously searching for the available channel accesses a device that operates using the available channel and thereby operates.

FIG. 1 is a diagram to describe interference that may occur due to a white space device in a digital broadcasting system.

Referring to FIG. 1, in the digital broadcasting system, white space devices may search for and use a white space. Initially, when a broadcasting transmitting station 100 transmits a broadcasting signal, television (TV) sets 110, 111, and 112 within an area 101 in which the transmitted broadcasting signal maintains signal strength to be greater than or equal to a reference value may view TV broadcasting by the broadcasting signal. Here, the broadcasting signal does not arrive at a remaining area excluding the area 101 and thus, a white space may be present. Devices present within the remaining area may be white space devices, for example, first white space devices 210 and 230, and second white space devices 220 and 240. The white space devices may also transmit propagation and thus, an area 200 excluding an interval 120 corresponding to a distance of arrival of the devices may be an actual white space.

The white space devices may include the first white space devices 210 and 230 that have a spectrum sensing or a database access function and thus, are capable of autonomously searching for an available channel, and the second white space devices 220 and 240 that are incapable of autonomously searching for the available channel and thus, access a white space device having secured the available channel to use the available channel.

Meanwhile, according to the present invention, the first white space devices 210 and 230 that are in operation by securing the available channel may transmit a connection recognition signals (211 and 231) for the second white space devices 220 and 240 incapable of performing spectrum sensing or database access. For example, when the first white space device 230 transmits a connection recognition signal, the second white space device 240 may verify the connection recognition signal and may determine a white space. Here, when the second white space device 240 may use the white space, an area of arrival by the white band use of the second white band device 240 may be indicated as a reference numeral 241.

Similarly, the second white space device 220 may verify a connection recognition signal transmitted from the first white space device 210, and may use a white space used by the first white space device 210 based on the verification result. In this case, an area of arrival by the white band use of the second white band device 220 may be indicated as a reference numeral 221. However, since signal strength of the connection recognition signal transmitted from the first white space device 210 may be constant, an area of arrival 211 of the first white space device 210 may also reach at the interval 120. Also, the second white space device 220 may be positioned within the interval 120. Due to the above characteristic, interference may occur in the TV set 110 that is positioned around the first white space device 210 and the second white space device 220.

Figure 2:
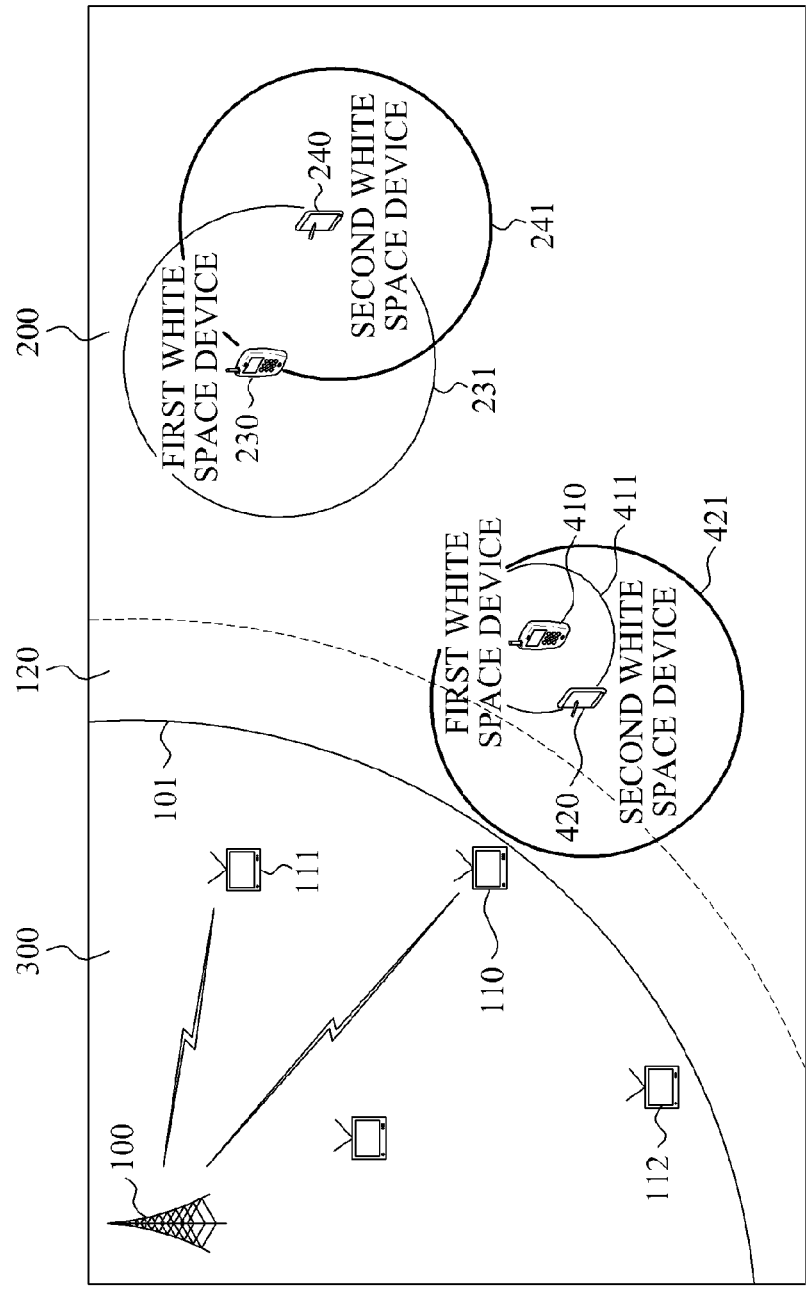
FIG. 2 is a diagram to describe an operation for decreasing interference occurrence of FIG. 1 in a white space use system using a connection recognition signal according to an embodiment of the present invention.

FIG. 2 is a diagram to describe an operation for decreasing interference occurrence of FIG. 1 in a white space use system using a connection recognition signal according to an embodiment of the present invention.

Referring to FIG. 2, in the white space use system of the present invention, a connection recognition signal transmitted between white space devices may be variably adjusted.

Specifically, a first white space device of the present invention may perform a spectrum sensing or a database access function, and may verify at least one of a position of the first white space device and a distance of arrival of a protection service. Accordingly, the first white space device may adjust strength of a connection recognition signal based on the position of the first white space and the distance of arrival of the protection service.

Referring to FIG. 2, a first white space device 410 of the present invention may transmit a connection recognition signal (411) weakly compared to the related art, based on the area 101 corresponding to a TV broadcasting section and the interval 120. Accordingly, interference from a second white space device 420 interacting with the first white space device 410 may not occur in the TV set 110 that is receiving an existing service.

Figure 3:
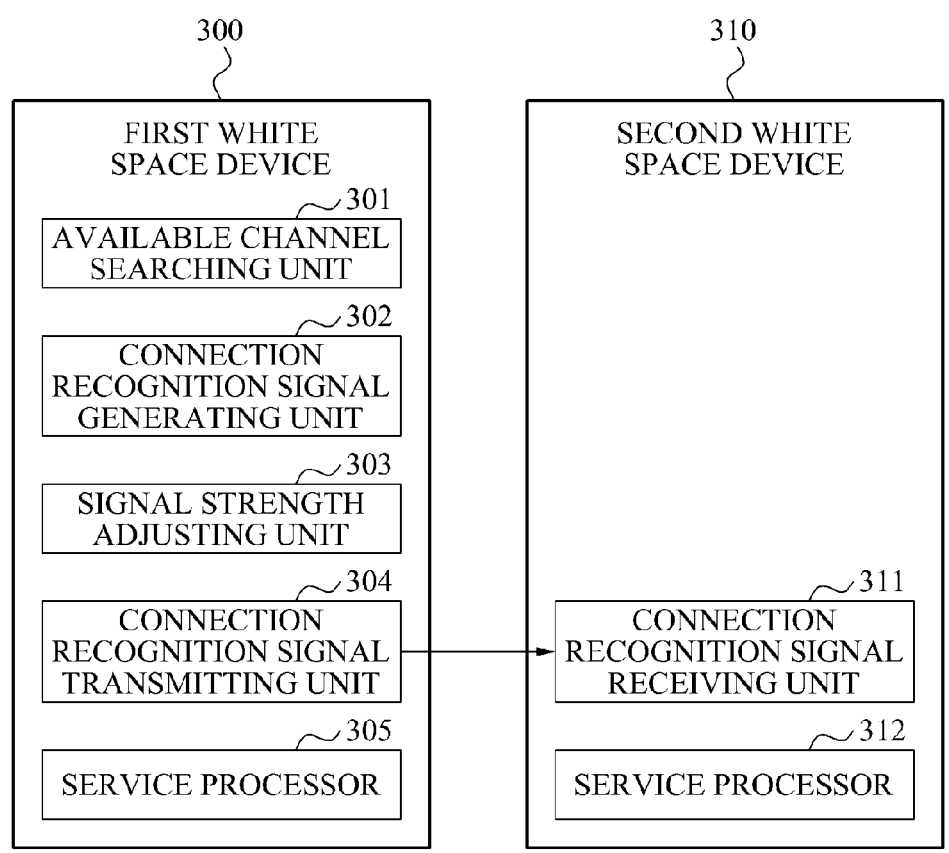
FIG. 3 is a block diagram illustrating a configuration of a white band use system using a connection recognition signal according to an embodiment of the present invention.

A first white space device and a second white space device may include constituent elements of FIG. 3.

Referring to FIG. 3, a first white space device 300 refers to a device that may search for an available channel using at least one of a spectrum sensing, a database access function, and a beacon transmission and reception, and may include an available channel searching unit 301, a connection recognition signal generating unit 302, a signal strength adjusting unit 303, a connection recognition signal transmitting unit 304, and a service processor 305.

A second white space device 310 refers to a device that is not provided with a function of searching for the available channel using at least one of the spectrum sensing, the database access function, and the beacon transmission and reception, and may include a connection recognition signal receiving unit 311 and a service processor 312.

Referring to the first white space device 300, the available channel searching unit 301 may search for the available channel using at least one of the spectrum sensing, the database access function, and the beacon transmission and reception The connection recognition signal generating unit 302 may generate a connection recognition signal that includes information associated with the retrieved available channel.

The signal strength adjusting unit 303 may obtain a distance of arrival of a protection service and a current position of the first white space device 300, and may adjust strength of the connection recognition signal based on a distance between the obtained distance of arrival and current position The connection recognition signal transmitting unit 304 may transmit the strength adjusted connection recognition signal. In this case, the second white space device 310 positioned around the first white space device 300 may receive the transmitted connection recognition signal.

Meanwhile, the service processor 305 may operate using the available channel retrieved by the available channel searching unit 301.

Referring to the second white space device 310, the connection recognition signal receiving unit 311 may receive the strength adjusted connection recognition signal that is transmitted from the first white space device 300. The service processor 312 of the second white space device 310 may recognize the available channel used by the first white space device 300, based on the connection recognition signal received by the connection recognition signal receiving unit 311. Accordingly, the service processor 312 may use the recognized available channel.

The above-described exemplary embodiments of the present invention may be recorded in non-transitory computer-readable media including program instructions to implement various operations embodied by a computer. The media may also include, alone or in combination with the program instructions, data files, data structures, and the like. Program instructions recorded in the media may be specially designed and configured for the present invention and may also be known to those skilled in the art and thereby be implemented.

Although a few exemplary embodiments of the present invention have been shown and described, the present invention is not limited to the described exemplary embodiments.

Instead, it would be appreciated by those skilled in the art that changes may be made to these exemplary embodiments without departing from the principles and spirit of the invention, the scope of which is defined by the claims and their equivalents.

What is claimed is:

1. A white space use system, comprising:
   a first white space device to search for an available channel using at least one of a spectrum sensing, a database access function, and a beacon transmission and reception, and to use the retrieved available channel; and
   a second white space device that is not provided with a function of searching for the available channel using at least one of the spectrum sensing, the database access function, and the beacon transmission and reception,
   wherein, through a cognitive radio communication scheme, the first white space device transmits a connection recognition signal including information associated with the retrieved available channel, adjusts strength of the connection recognition signal based on a distance between a distance of arrival of a protection service and a current position of the first white space device, and transmits the strength adjusted connection recognition signal, and
   the second white space device recognizes the available channel used by the first white space device, based on the connection recognition signal transmitted from the first white space device.

* * * * *